E. STERNS.
VEHICLE TIRE EMPLOYING AN INNER TUBE.
APPLICATION FILED MAR. 6, 1917.

1,324,282. Patented Dec. 9, 1919.

Inventor:
EDWARD STERNS,
By John W. Bruninga
His Attorney.

UNITED STATES PATENT OFFICE.

EDWARD STERNS, OF ST. LOUIS, MISSOURI, ASSIGNOR, BY MESNE ASSIGNMENTS, TO SURETY TIRE & RUBBER COMPANY, OF WILMINGTON, DELAWARE, A CORPORATION OF DELAWARE.

VEHICLE-TIRE EMPLOYING AN INNER TUBE.

1,324,282.  Specification of Letters Patent.  Patented Dec. 9, 1919.

Application filed March 6, 1917. Serial No. 152,909.

*To all whom it may concern:*

Be it known that I, EDWARD STERNS, a citizen of the United States, and residing at St. Louis, Missouri, have invented the new and useful Improvement in Vehicle-Tires Employing Inner Tubes, of which the following is a specification.

This invention relates to vehicle tires, and more particularly to tires employing a casing and an inner tube.

Certain types of inner tubes employ a reinforcing layer of fabric or other substantially inelastic material, which extends around the tube wall, so as to reinforce the tube against blowouts, and in certain cases, to confine the rubber at the tread to close punctures. This fabric must, however, be interrupted at the tread, so as to permit for the necessary expansion of the tube in order that this tube may furnish a pneumatic backing for the casing. As this tube is thin at its inner circumference, where the valve stem is attached, this valve stem is liable to tear out and thus destroy the tube.

One of the objects of this invention, therefore, is to provide an inner tube which is reinforced by a fabric or the like, in such a manner as to permit expansion of the tube, but which has provisions for reinforcing the tube at the valve seat.

Further objects will appear from the detail description taken in connection with the accompanying drawing, in which, Figure 1 is a longitudinal section of an inner tube embodying this invention;

Referring to the accompanying drawing, and more particularly to Figs. 1, 2 and 3, 7 designates an inner tube comprising a body material of inner tube rubber, or any other suitable elastic material having the characteristics of rubber, the wall thickness increasing from the inner to the outer circumference of the tube, so as to provide a thick tread. In accordance with this invention, however, the body material has embedded therein, a layer 8 of substantially inelastic material, comprising in this case, tire fabric such as Sea Island cotton. This tube can be formed on a mandrel with the layers of rubber and fabric applied successively, and the whole vulcanized together, so as to form an integral structure, with a layer of fabric close to the outside of the tube. This layer of fabric will, therefore, confine the rubber at the tread, so as to prevent expansion thereof. In order, however, to allow for the necessary transverse expansion of the tube, the fabric is interrupted at the inner circumference or rim side of the tube. The tube is provided with the usual valve stem 4 having a head 5 and a nut 6, to clamp the valve to the tube. The construction of the tube may be as described in my application Serial No. 152,907 filed of even date herewith.

In order to provide a reinforcement for the valve seat, the fabric at the tube is extended across the tube at the valve, as shown at 9, the ends of the fabric being shown as overlapping, so as to provide a reinforced structure across the valve, resulting in a reinforced valve seat.

Figure 1:
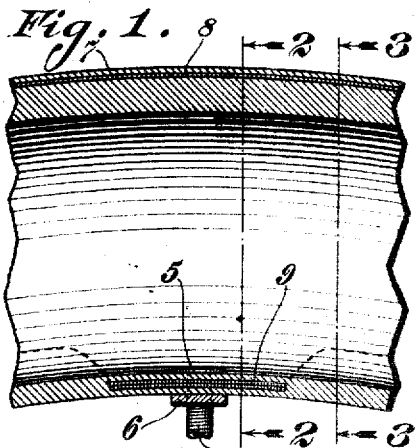
Figure 4:
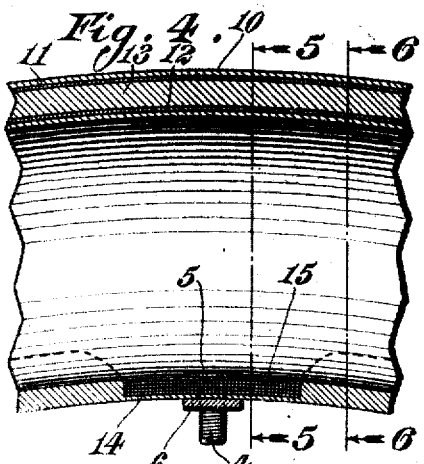
Fig. 4 is a view similar to Fig. 1, but showing another embodiment of this invention.
Figure 2:
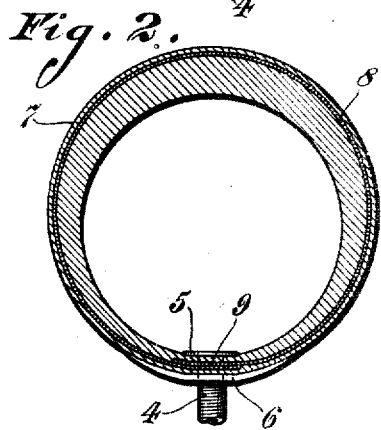
Fig. 2 is an enlarged section on the line 2—2, Fig. 1.
Figure 5:
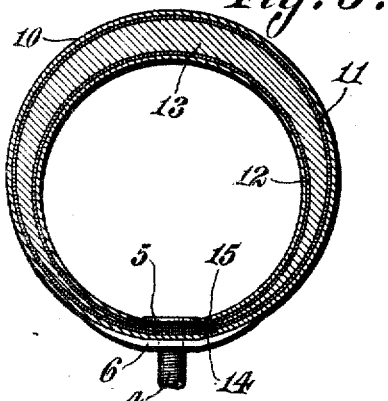
Fig. 5 is an enlarged section on the line 5—5, Fig. 4.
Figure 3:
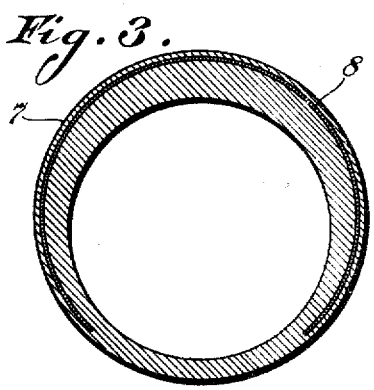
Fig. 3 is an enlarged section on the line 3—3, Fig. 1.
Figure 6:
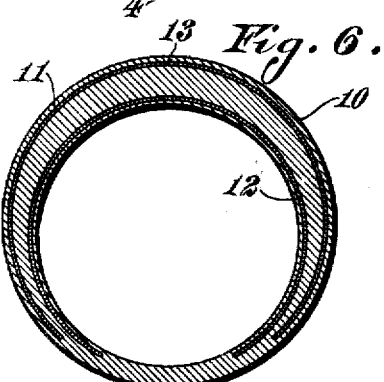
Fig. 6 is an enlarged section on the line 6—6, Fig. 4.

In the construction shown in Figs. 4, 5 and 6, which shows a tube shown and described in Patent No. 1,218,486, granted March 6, 1917, the tube comprises a body 10 of rubber, having combined therewith, layers 11 and 12 of fabric, such as Sea Island cotton, these layers of fabric being arranged in spaced relation, so as to confine a layer 13 of rubber therebetween. In this case also, the fabric layers are interrupted at the inner circumference or rim side of the tube, so as to provide for the necessary transverse expansion of the tube. These fabric layers, however, extend across the tube at the valve, as shown at 14 and 15, and overlap, so as to reinforce the rubber at the valve, and provide a reinforced valve seat.

It will, therefore, be seen that in accordance with this invention, the tube is not only reinforced, so as to prevent and close punctures and prevent blowouts, but in such a manner as to permit the necessary transverse expansion of the tube, but the extension of the fabric across the valve, provides a reinforced valves seat of great strength, and which will not tear out. This does not, however, detract from the necessary expansible feature in any manner whatsoever, as the transverse restraint of the tube at the valve is not sufficient to cause looseness of the tube as a whole, especially since the tube is clamped at this point to the wheel rim.

It is obvious that various changes may be made in the details of construction without departing from the spirit of this invention. It is, therefore, to be understood that this invention is not to be limited to the specific construction shown and described.

Having thus described the invention, what is claimed is:

1. In a vehicle tire, the employment of an inflatable inner tube comprising, elastic material having combined therewith at the tread a layer of inelastic material extending transversely around the tube so as to confine the elastic material at the tread, said layer of inelastic material being interrupted at the rim, but extending across the tube at the valve so as to provide a reinforced valve seat.

2. In a vehicle tire, the employment of an inflatable inner tube comprising, elastic material having combined therewith at the tread layers of inelastic material extending transversely around the tube and disposed in axially spaced relation at the tread so as to confine the elastic material therebetween, said layers of inelastic material being interrupted at the rim but extending across the tube at the valve so as to provide a reinforced valve seat.

3. In a vehicle tire, the employment of an inflatable inner tube of rubber thickened at the tread having combined therewith at the outer surface of the tread a fabric strip, extending transversely around the tread but interrupted at the rim, so as to confine a thick body of rubber in a neutral state at the tread and inside of said fabric strip, adapted to permit transverse expansion of the tube at the rim but prevent expansion of the confined rubber at the tread, said tube having fabric extending across the same at the valve so as to provide a reinforced valve seat, substantially as and for the purpose set forth.

4. In a vehicle tire, the employment of an inflatable inner tube of elastic material having combined therewith layers of inelastic material extending transversely around the tube and disposed in axially spaced relation at the tread to confine the elastic material therebetween, said inelastic layers being interrupted at the rim and adapted to permit transverse expansion of the tube at the rim, said tube having fabric extending across the same at the valve so as to provide a reinforced valve seat, substantially as and for the purpose set forth.

In testimony whereof I affix my signature this 23rd day of February, 1917.

EDWARD STERNS.